March 31. 1925.
D. J. FLINTJER
DOWEL PIN AND MORTISE LOCK
Filed July 21, 1922
1,531,916
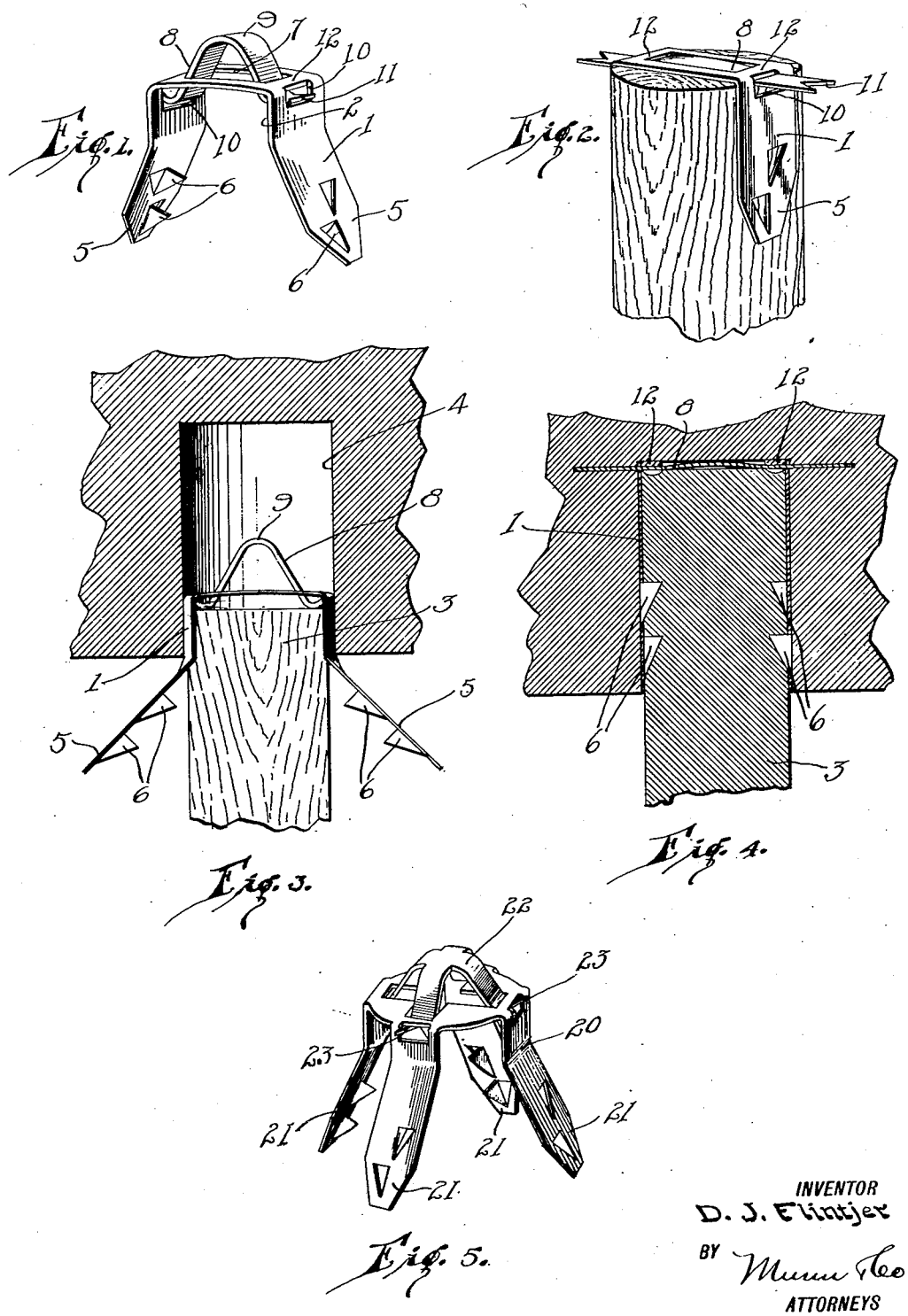

Patented Mar. 31, 1925.

1,531,916

UNITED STATES PATENT OFFICE.

DANIEL J. FLINTJER, OF CHICAGO, ILLINOIS, ASSIGNOR TO INTER-NATIONAL STEEL GRIP COMPANY (A COMMON-LAW TRUST), AND DANIEL JAY FLINTJER, F. H. FLINTJER, AND G. M. BENEDICT, TRUSTEES.

DOWEL PIN AND MORTISE LOCK.

Application filed July 21, 1922. Serial No. 576,498.

*To all whom it may concern:*

Be it known that I, DANIEL J. FLINTJER, a citizen of the United States, and a resident of Chicago, in the county of Cook and State of Illinois, have invented a new and useful Improvement in Dowel Pins and Mortise Locks, of which the following is a full, clear, and exact description.

My invention relates to improvements in dowel pins and mortise locks, and it consists in the combinations, constructions, and arrangements herein described and claimed.

An object of my invention is to provide an improvement over that form of the device shown in the prior patent of Alva B. Smith, No. 1,251,298, of December 25, 1917. In said prior patent there was disclosed a dowel pin and mortise lock which was assembled on the pin and the pin driven home in the mortise, whereupon the device automatically locked the pin in place. The construction of the present device is primarily designed to obviate the danger of breaking the member which holds the anchor, whereby the device securely holds the dowel pin in place when the pin has once been assembled in the mortise.

A further object of my invention is to provide a device of the type described in which the prongs of the anchor are bent upwardly adjacent to their ends, whereby they will lie in a plane parallel to the top of the dowel pin when they are driven home.

A further object of my invention is to provide a device of the type described in which the device has means for entering the dowel pin, the means being alined with the grain of the pin, whereby it will be readily forced into place.

A further object of my invention is to provide a device of the type described which is simple in construction and which is durable and efficient for the purpose intended.

Other objects and advantages will appear in the following specification, and the novel features of the invention will be particularly pointed out in the appended claim.

My invention is illustrated in the accompanying drawings, forming part of this application, in which—

Figure 1 is a perspective view of the device,

Figure 2 is a perspective view of the device shown operatively applied to a dowel pin, the anchor being shown in extended position, Figure 3 is a vertical section of a dowel pin and mortise, showing the device operatively applied thereto and before the pin is driven home, Figure 4 is a similar view to Figure 3 and shows the dowel pin driven home, and Figure 5 is a perspective view of a modified form of the device.

In carrying out my invention, I provide a strip of relatively thin and pliant metal 1 which is bent into the shape shown in Figures 1 and 3. The strip 1 has a U-shaped portion 2 which is adapted to receive the end of a dowel pin 3 (see Figure 3). It is obvious that the sides of the U-shaped portion may be spaced away from each other at any desired distance so as to readily receive dowel pins of different diameters. The metal strip 1 is preferably thin enough so as to be readily received within the mortise 4 when the pin 3 is driven home.

The legs 5 of the strip 1 are bent outwardly and are provided with inwardly projecting prongs 6. It should be noted at this point that the prongs 6 lie in the same plane, the plane passing through the longitudinal axis of the dowel pin 3. In this manner, the prongs 6 are alined with the grain of the wood and will not readily bend out of shape when they are driven home. In the devices of which I am aware, the prongs do not extend in a plane which cuts through the axis of the dowel pin, whereby the pins will be apt to be bent when coming into contact with the grain. The prongs 6 are portions of the strips 1 cut and bent in the manner clearly shown in Figure 1. Figure 4 shows the prongs when embedded in the dowel pin 3.

The U-shaped portion of the strip 1 has an opening or slot 7 in the top thereof which is adapted to receive a loop 8 of an anchor pin 9. The sides of the U-shaped portion have openings 10 therein, through which the prongs 11 and the anchor 8 extend. As clearly shown in Figure 3, the prongs 11 are bent upwardly adjacent to the ends thereof, whereby they will enter the wall of the mortise 4 at an angle. If the prongs 11 enter the wall 4 in a plane parallel with the top of the pin 3, the prongs would be bent downwardly as the pin is driven home. This would tend to make a weak bedding for the anchor and the dowel pin 3 would not be rigidly secured in place. Furthermore, if the prongs 11 were parallel with the top of the pin 3, the strips 12, between the opening 7 and the openings 10, would be subjected to a great strain and in many cases the anchor pin 9 would break the strips. It would therefore be apparent that the anchor pin would not be held to the dowel pin, and that the pin could therefore readily be removed.

By curving the prongs 11 in the manner heretofore described, the force of the blow which drives the prongs 11 into the wood, would be carried by the pin 3 and not by the strips 12. The curved portions of the prongs bear against the pin 3 instead of the strips 12 during the time the pin is being straightened. The portions of the pin between the loop 8 and the curved portions move outwardly as the pin is straightened, the pin being ductile enough to keep the same curves at the points adjacent to the dowel 3 during the entire movement. The curves in the pin remain until the portion of the member 1 that is spaced from the end of the dowel pin 3 is forced against the dowel pin 3. The ends of the pin 9 slide over the pin 3 as the dowel pin is being driven home. The anchor would therefore be securely held to the strip 1 when assembled in the mortise 4.

From the foregoing description of the various parts of the device, the operation thereof may be readily understood. As heretofore stated, the strip 1 is U-shaped and has its legs bent outwardly in the manner clearly shown in Figure 3. The anchor 8 has its loop portion 9 projecting through the opening 7, and the prongs 11 projecting through the openings 10, whereby the anchor is held in place with respect to the strip 1. The device is then assembled to the dowel pin 3 in the manner illustrated in Figure 3, and the dowel pin, with the device, is inserted in the opening or mortise 4. The dowel pin 3 is now driven home in the ordinary manner, and it will be noted that the wall of the mortise will cause the legs 5 to be swung into engagement with the side of the dowel pin and to drive the prongs 6 into the pin. The prongs 6 lie in the same plane with respect to each other, this plane cutting through the longitudinal axis of the dowel pin, whereby the prongs will enter with the grain of the pin. This construction provides a simple means whereby the prongs will readily enter the pin and will not be bent out of shape. A further movement of the dowel pin into the mortise 4 causes the loop 9 to enage with the end of the mortise, whereupon the prongs 11 will be driven into the wall of the mortise. Since the prongs 11 are curved upwardly at their ends, they will tend to move in an upward direction as the pin 3 is driven home. It will therefore be apparent that the prongs will not be bent in a downward direction when assembled, but will take the shape shown in Figure 4. It should also be noted that the force of the blow upon the loop 9 when it engages with the end of the mortise 4, is not carried by the piece 12, but is carried by the dowel pin 3. As clearly shown in Figure 3, the portions of the anchor adjacent to the prongs, bear against the pin 3, the pin therefore receiving the entire force of the blow. In fact, the anchor does not engage with the strips 12 as it is forced into place. The anchor is securely held to the pin 3 by the strips 12 when it is forced into place, and the pin is locked in the mortise.

The device is locked in place on the pin 3 and is also locked in place in the mortise 4 in one operation, i. e., the driving of the dowel pin into the mortise 4. This operation, as heretofore described, causes the prongs 6 to embed themselves in the pin 3, and causes the prongs 11 to embed themselves in the wall of the mortise 4. The anchor 8 is made of much heavier material than is the piece 1, the piece 1 being of such a thickness as to readily bend when the pin 3 is driven into the mortise 4.

In Figure 5 I have shown a modified form of the device, this form being identical with the form heretofore described, except that it is provided with a piece 20 having four legs 21, and an anchor 22 having four prongs 23. This form of the device is adapted to be employed in heavier work where dowel pins of larger diameters have to be assembled in mortises. It is obvious that the number of legs of the device and the number of prongs of the anchor may be varied at will without departing from the spirit and scope of the invention. The principal features of the device are the positioning of the prongs 6 and the prongs 11, whereby they will readily enter the work and will not be bent out of shape when assembled. The device is very simple in construction and is inexpensive to manufacture. It may be readily applied to any dowel pin and effectually locks the pin in the mortise when the pin is driven home.

I claim:

A device of the character described comprising a U-shaped anchor retaining member adapted to frictionally engage with a dowel pin, the legs of said members being shaped to contact with the surface of said pin for a portion of their length, and then being bent outwardly adjacent to their ends, the outwardly bent portions of said legs having teeth that are adapted to be spaced free of the dowel pin, but are adapted to enter the dowel pin when it is driven into place, an anchor pin adapted to be secured to the dowel pin by said anchor retaining member, said anchor pin being shaped so as to only bear against the dowel pin as the dowel pin is being driven into place, whereby the strain on the retaining member is eliminated, said anchor pin having its ends bent upwardly so as to cause said pin to straighten out when driven home.

DANIEL J. FLINTJER.